United States Patent
Kim et al.

(10) Patent No.: US 8,505,667 B2
(45) Date of Patent: Aug. 13, 2013

(54) THROW TYPE COMPACT RECONNAISSANCE ROBOT

(75) Inventors: Soohyun Kim, Daejeon (KR);
Kyung-Soo Kim, Daejeon (KR);
Jeehyoung Kim, Seoul (KR); Wonsuk Jung, Daejeon (KR); Chulyoung Kim, Daejeon (KR); Yunsic Hong, Daejeon (KR); Hyunsoo Park, Daejeon (KR); Kyuje Yoo, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 82 days.

(21) Appl. No.: 13/166,057

(22) Filed: Jun. 22, 2011

(65) Prior Publication Data
US 2011/0308873 A1 Dec. 22, 2011

(30) Foreign Application Priority Data
Jun. 22, 2010 (KR) .................. 10-2010-0059277

(51) Int. Cl.
*B62D 61/00* (2006.01)
(52) U.S. Cl.
CPC .................................. *B62D 61/00* (2013.01)
USPC ...................................... 180/218; 180/65.51
(58) Field of Classification Search
USPC .............. 180/65.51, 218, 6.48, 6.5, 68.5
See application file for complete search history.

(56) References Cited

U.S. PATENT DOCUMENTS

| | | | | |
|---|---|---|---|---|
| 4,621,562 A | * | 11/1986 | Carr et al. | 89/41.05 |
| 4,936,409 A | * | 6/1990 | Nix et al. | 180/68.5 |
| 4,979,582 A | * | 12/1990 | Forster | 180/20 |
| 5,871,386 A | * | 2/1999 | Bart et al. | 446/460 |
| 6,009,358 A | * | 12/1999 | Angott et al. | 701/25 |
| 6,502,657 B2 | * | 1/2003 | Kerrebrock et al. | 180/218 |
| 6,902,464 B1 | * | 6/2005 | Lee | 446/456 |
| 7,559,385 B1 | * | 7/2009 | Burt et al. | 180/65.1 |
| 7,766,719 B2 | * | 8/2010 | Ishihara et al. | 446/409 |
| 8,162,351 B2 | * | 4/2012 | Lee et al. | 280/755 |
| 2003/0137268 A1 | * | 7/2003 | Papanikolopoulos et al. | 318/568.11 |
| 2011/0121676 A1 | * | 5/2011 | Zhu et al. | 310/156.35 |
| 2011/0174565 A1 | * | 7/2011 | Rochat et al. | 180/167 |

FOREIGN PATENT DOCUMENTS

| | | |
|---|---|---|
| KR | 1020010093178 | 10/2001 |
| KR | 10-2007-0067928 | 6/2007 |
| KR | 1020070067928 | 6/2007 |
| KR | 100835952 | 6/2008 |
| KR | 1020100089400 | 8/2010 |

* cited by examiner

*Primary Examiner* — Joseph Rocca
*Assistant Examiner* — Maurice Williams
(74) *Attorney, Agent, or Firm* — Cantor Colburn LLP

(57) ABSTRACT

Provided is a throw-type compact reconnaissance robot, which is used for military purposes or counter-terrorism and is capable of ensuring a long operational time as well as drop safety by efficient spatial layout of a battery. The throw-type compact reconnaissance robot includes a cylindrical body (100) with a camera (140), drivers (200) made up of two tires (270) that are disposed on opposite sides of the body (100) and is drivable individually, and battery units (300) supplying power used to operate the robot and disposed in inner spaces of the tires (270) of the drivers (200) on the opposite outermost sides of the robot.

10 Claims, 9 Drawing Sheets

THROW TYPE COMPACT RECONNAISSANCE ROBOT

BACKGROUND OF THE INVENTION

1. Field of the Invention

The present invention relates, in general, to a throw-type compact reconnaissance robot used for military purposes or counter-terrorism and, more particularly, to a throw-type compact reconnaissance robot capable of ensuring a long operational time as well as drop safety by efficient spatial layout of a battery.

2. Description of the Related Art

With the rapid progress of worldwide urbanization, war assumes an aspect of street fighting. Although war does not necessarily break out, a variety of crimes and terrorism take place around us at unexpected times and in unforeseen places. In the event of such incidents occurring, it is essential to grasp the initial situation for rapid and suitable countermeasures. Most of the spots where the incidents take place frequently do not permit easy access by soldiers, policemen, or rescuers, so that the situation becomes worse or damage is heightened.

For this reason, when the chaser of the enemy or offender encounters an uncertain building or space whose interior is unknown during a chase, reconnaissance robots are frequently used to be able to rapidly check the status of the interior.

Such reconnaissance robots have low mobility due to a relatively large size. Furthermore, under conditions where the robots cannot gain access due to a narrow passage or a natural disaster, the robots cannot be used in a timely manner.

To solve this problem, throw-type reconnaissance robots that are designed to be thrown by hand or by a throwing machine have recently been developed. These robots overcome the existing problem with regard to accessibility or agility. However, the robots should be light and compact enough to be thrown, which causes difficulty in spatial arrangement. Thus, only a compact battery can be mounted, so that the robots are restricted by operational time.

Further, the compact reconnaissance robots secure smooth infiltration due to their low height, but they have difficulty in carrying out reconnaissance at a desired height. Failure of parts of the reconnaissance robot caused by a drop shock when the robot is thrown becomes an important problem in interfering with the popularization of the throw-type reconnaissance robots.

SUMMARY OF THE INVENTION

Accordingly, the present invention has been made keeping in mind the above problems occurring in the related art, and an objective of the present invention is to provide a throw-type compact reconnaissance robot capable of providing sufficient battery capacity so as to be able to ensure a long operational time, securing drop stability, and easily adjusting the viewing angle of a camera.

In order to achieve the above objective, according to one aspect of the present invention, there is provided a throw-type compact reconnaissance robot, which comprises: a cylindrical body with a camera; drivers made up of two tires that are disposed on opposite sides of the body and can be driven individually; and battery units supplying power used to operate the robot and disposed in inner spaces of the tires of the drivers on opposite outermost sides of the robot.

Here, each driver may include a cylindrical driving wheel; each tire may be fitted on an outer side of the driving wheel in a radial direction; and each battery unit may be disposed in an inner space of the cylindrical driving wheel.

Further, each driver may include a cylindrical driving wheel and a wheel driving motor, and the driving wheel and the wheel driving motor may be geared to transmit a driving force.

Each tire may be filled therein with air or a sponge so as to be able to absorb a shock when dropped.

Each battery unit may include a cylindrical battery housing, a battery mounted in the battery housing, and a battery housing cover.

Here, the battery housing and battery housing cover may be each formed of ultrahigh molecular weight polyethylene.

Further, the body may include a frame in which electric parts are mounted, and a shield cover that surrounds the frame and has a shape of a C-shaped thin plate.

The frame and the shield cover of the body may have rubber rings fitted around them.

Each rubber ring may include a metal wire as an antenna embedded therein so that the metal wire is connected to a circuit board for telecommunication mounted in the body and functions as the antenna when remote control is performed by radio.

The body may include a tail mounted on a rear surface thereof.

The tail may be adjusted in angle by a tail driving motor so as to be able to adjust a viewing angle of the camera.

According to another aspect of the present invention, there is provided a throw-type compact reconnaissance robot, which is connected to another throw-type compact reconnaissance robot using a connector member, in an internal connecting space of which a battery, an electric part, etc. are mounted as needed.

Here, the body may further include a repeater for telecommunication.

According to the present invention, the throw-type compact reconnaissance robot can secure sufficient space for the battery to be operated for a long time, sufficiently absorb a shock when dropped to ensure stability, and simply adjust a viewing angle of the camera.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
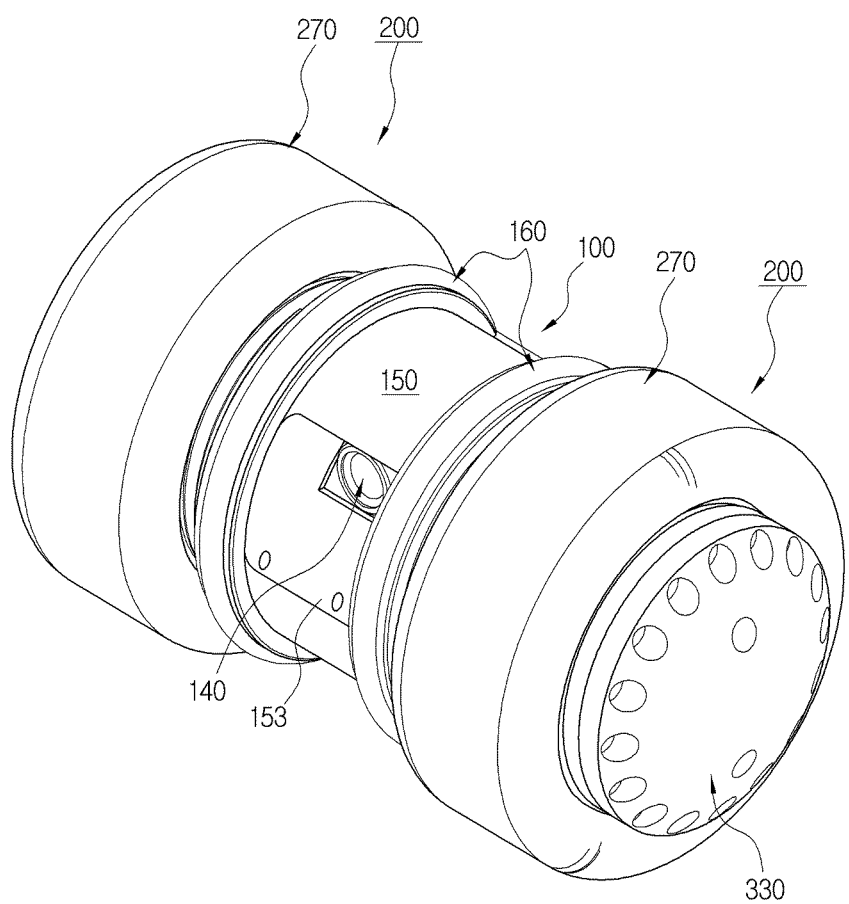
FIG. 1 is a perspective view showing an entire throw-type compact reconnaissance robot according to a first exemplary embodiment of the present invention.
Figure 2A:
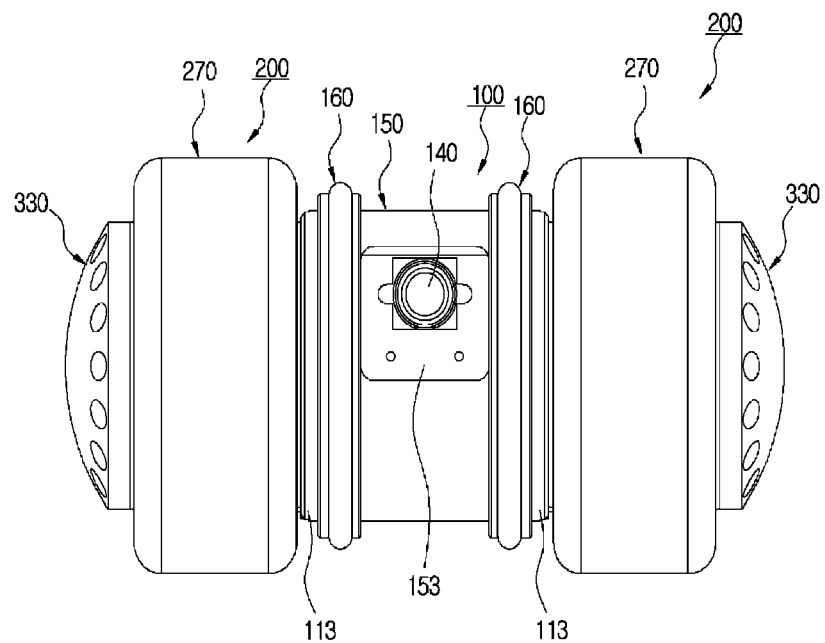
FIG. 2A shows the throw-type compact reconnaissance robot according to the exemplary embodiment of the present invention in front view.
Figure 2B:
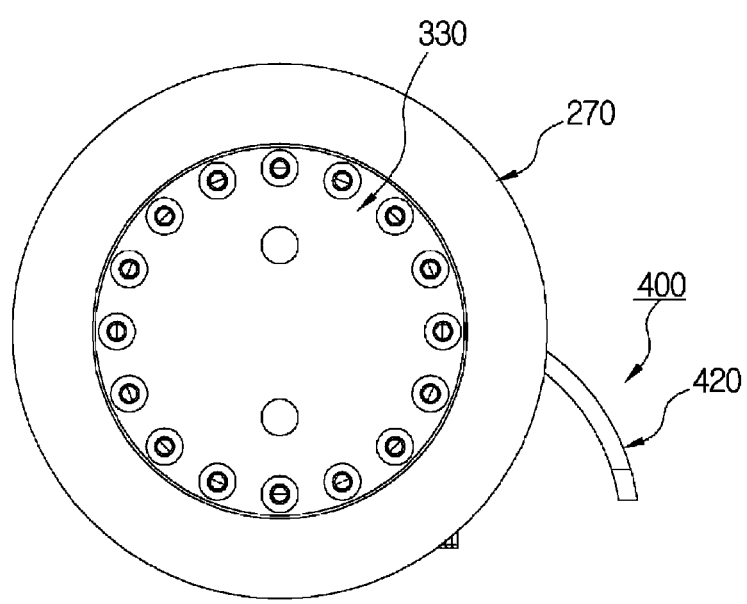
FIG. 2B shows the throw-type compact reconnaissance robot according to the exemplary embodiment of the present invention side view.
Figure 2C:
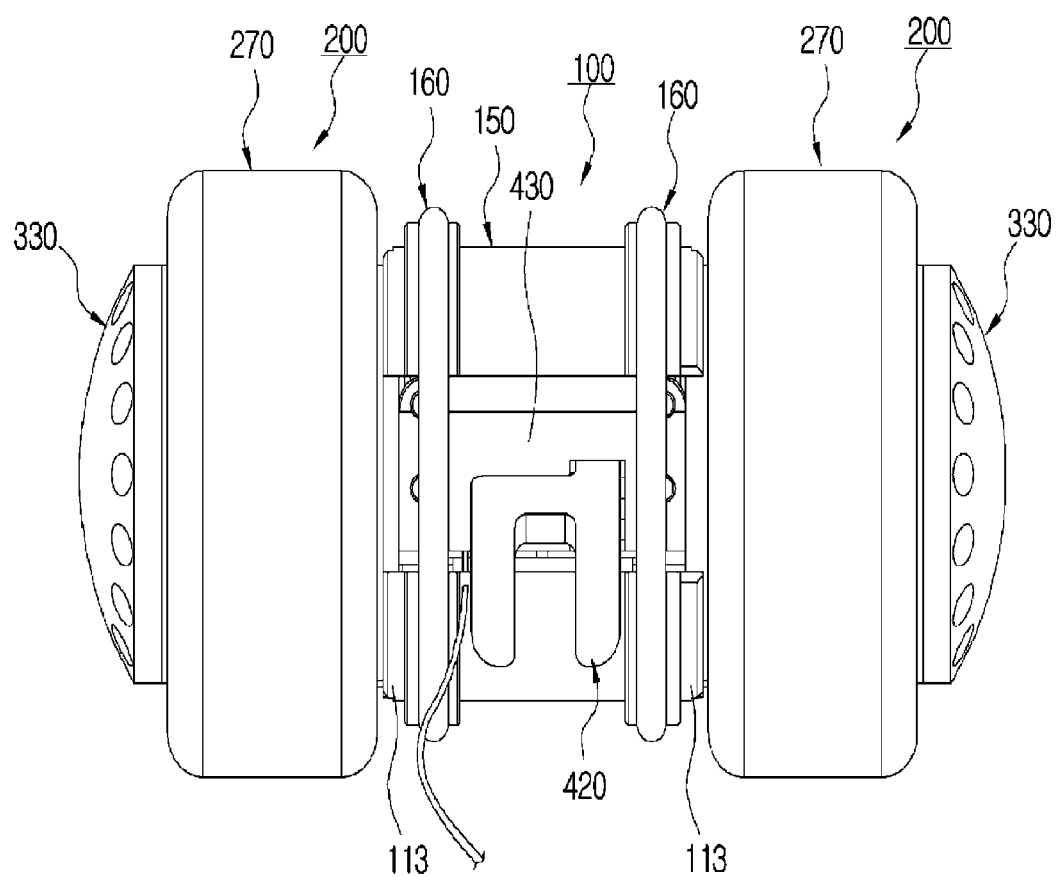
FIG. 2C shows the throw-type compact reconnaissance robot according to the exemplary embodiment of the present invention rear views.
Figure 3:
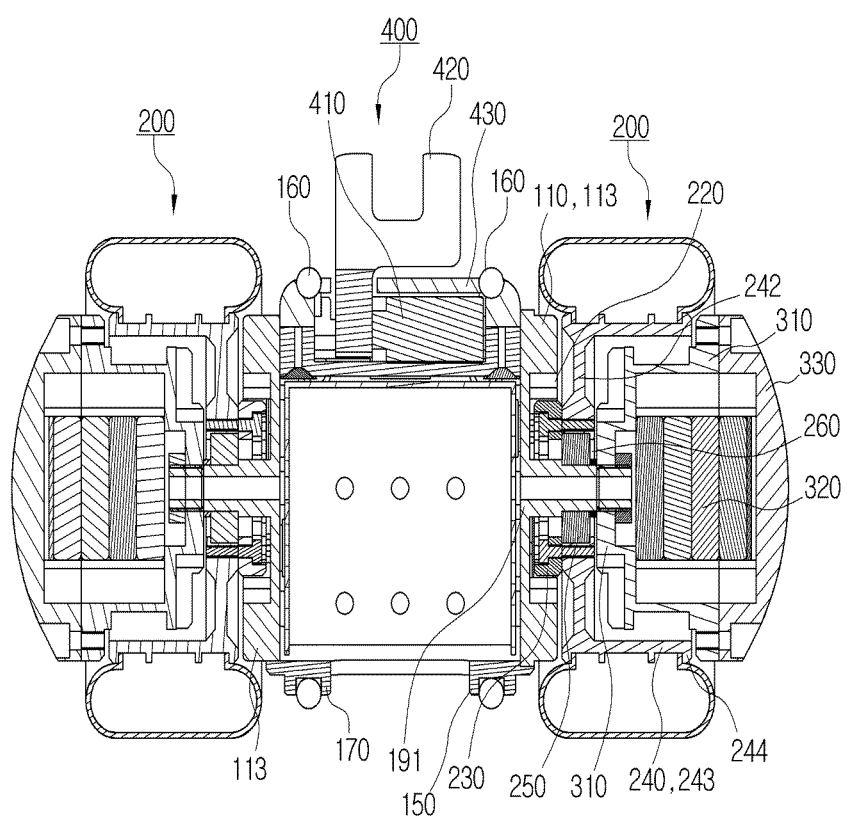
FIG. 3 is a cut top plan view showing the throw-type compact reconnaissance robot according to the exemplary embodiment of the present invention.
Figure 4:
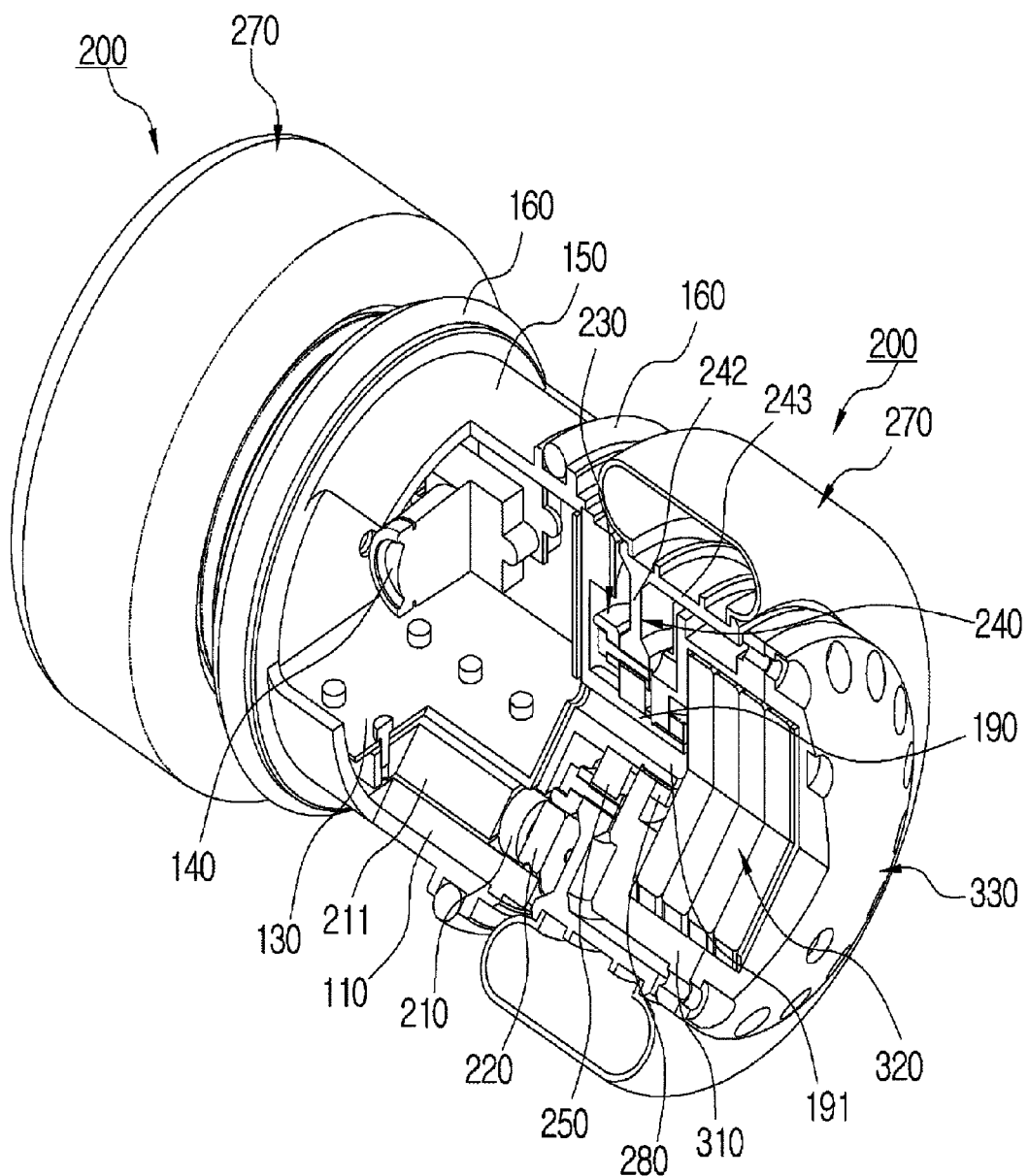
FIG. 4 is a cutaway perspective view showing the throw-type compact reconnaissance robot according to the exemplary embodiment of the present invention.
Figure 5:
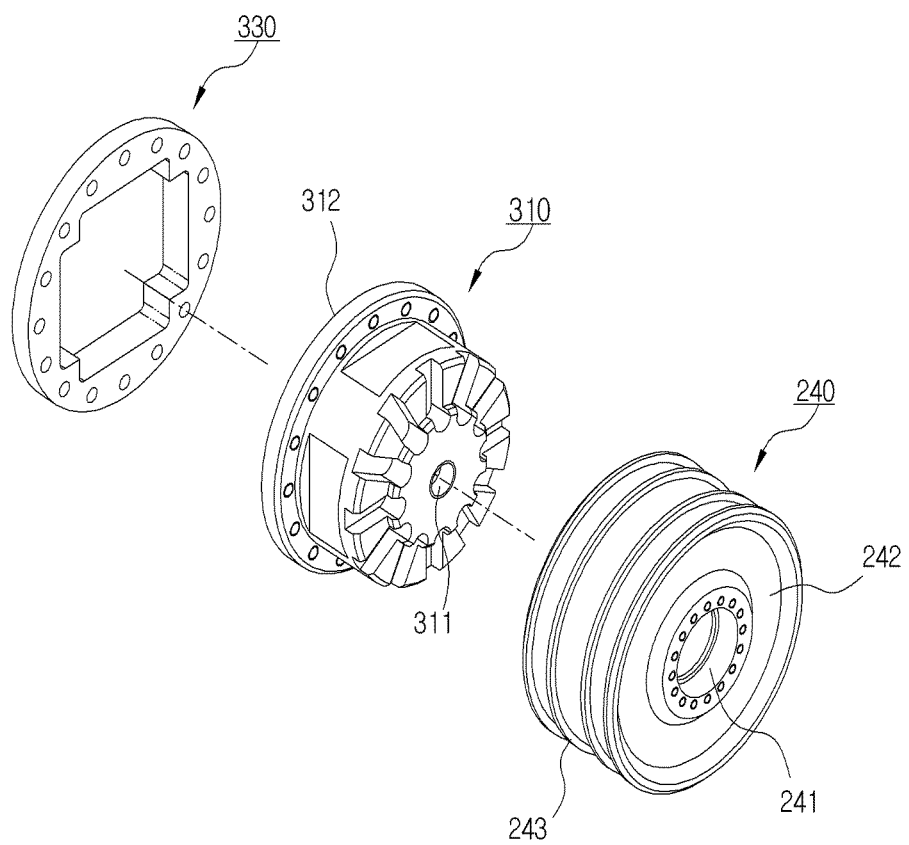
FIG. 5 is a partial exploded view showing a battery mounting space of the throw-type compact reconnaissance robot according to the exemplary embodiment of the present invention.
Figure 6:
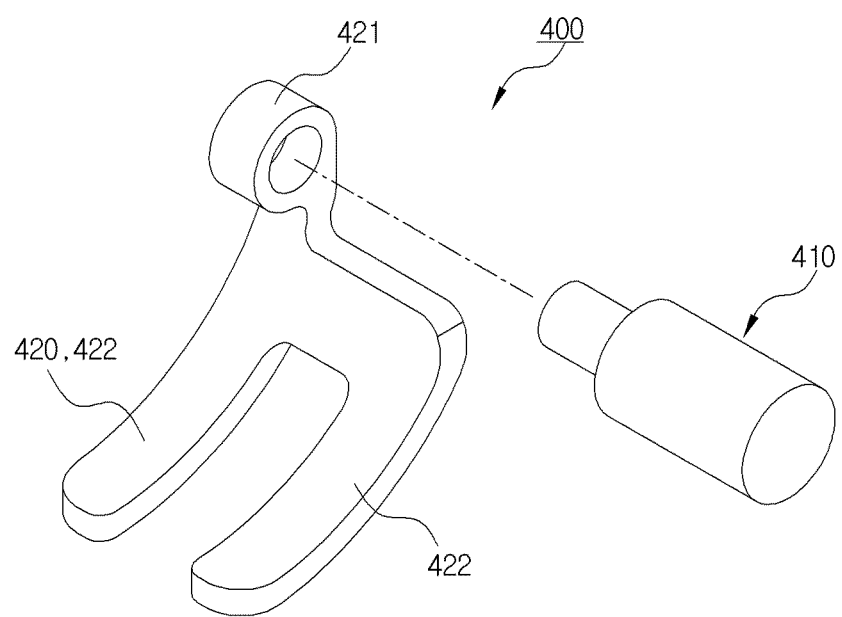
FIG. 6 is a perspective view showing a viewing angle adjustor of a camera of the throw-type compact reconnaissance robot according to the exemplary embodiment of the present invention.
Figure 7A:
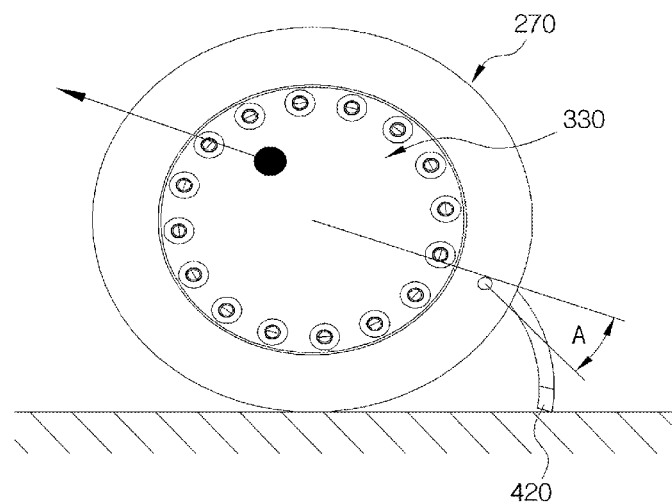
FIG. 7 is a side view for explaining a function of adjusting a viewing angle of the camera of the throw-type compact reconnaissance robot according to the exemplary embodiment of the present invention.
Figure 7B:
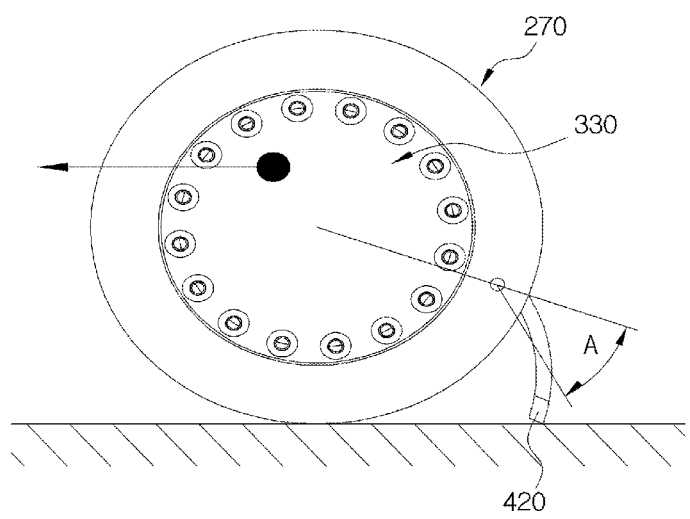
Figure 8:
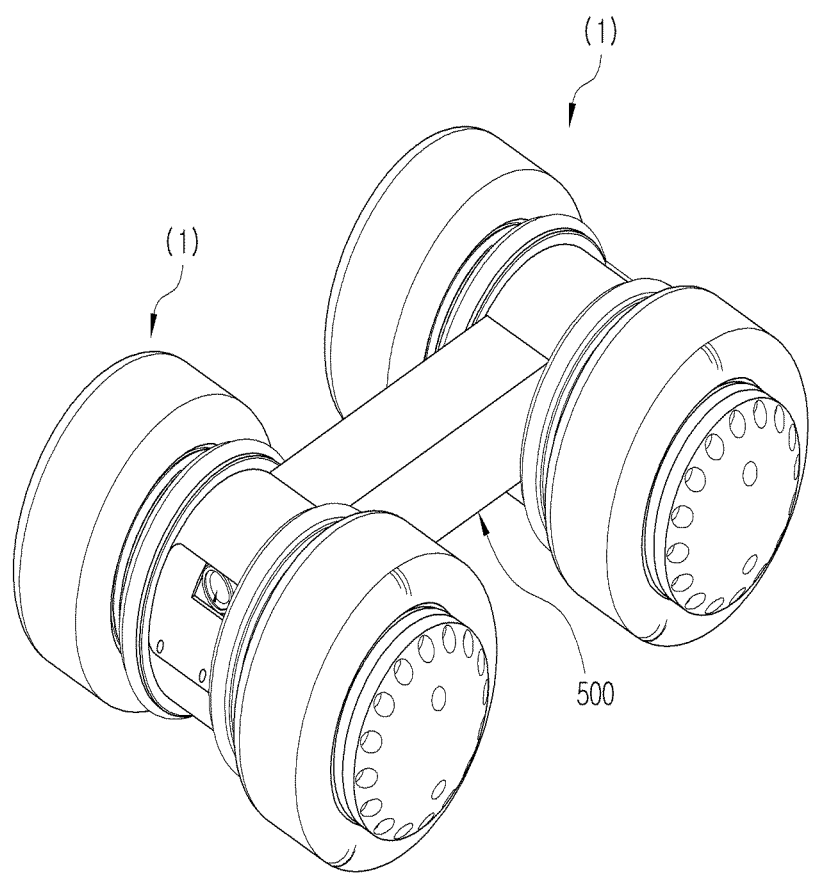
FIG. 8 is a perspective view showing a throw-type compact reconnaissance robot according to a second exemplary embodiment of the present invention.

The invention will be described more fully hereinafter with reference to the accompanying drawings, in which exemplary embodiments of the invention are shown. FIG. 1 is a perspective view showing an entire throw-type compact reconnaissance robot according to a first exemplary embodiment of the present invention. FIG. 2A shows the throw-type compact reconnaissance robot according to the exemplary embodiment of the present invention in front view. FIG. 2B shows the throw-type compact reconnaissance robot according to the exemplary embodiment of the present invention side view. FIG. 2C shows the throw-type compact reconnaissance robot according to the exemplary embodiment of the present invention rear view. FIG. 3 is a cut top plan view showing the throw-type compact reconnaissance robot according to the exemplary embodiment of the present invention. FIG. 4 is a cutaway perspective view showing the throw-type compact reconnaissance robot according to the exemplary embodiment of the present invention. FIG. 5 is a partial exploded view showing a battery mounting space of the throw-type compact reconnaissance robot according to the exemplary embodiment of the present invention. FIG. 6 is a perspective view showing a viewing angle adjustor of a camera of the throw-type compact reconnaissance robot according to the exemplary embodiment of the present invention. In addition, FIG. 7 is a side view for explaining a function of adjusting a viewing angle of the camera of the throw-type compact reconnaissance robot according to the exemplary embodiment of the present invention, and FIG. 8 is a perspective view showing a throw-type compact reconnaissance robot according to a second exemplary embodiment of the present invention.

In the following description, the parts that are similar to those of the prior art and are not required to understand the technical idea of the present invention will not be described, but the technical idea and scope of the present invention are not limited thereto.

First, the geometry of the throw-type compact reconnaissance robot 1 according to the first embodiment of the present invention will be schematically described with reference to FIGS. 1 and 2A to 2C.

The throw-type compact reconnaissance robot 1 is generally characterized by a body 100 including a camera 140 and drivers 200 made up of two tires 270 that are disposed on opposite sides of the body 100 and can be driven individually.

The body 100 is provided with a camera viewing angle adjustor 400 having a tail 420 on the side opposite the camera 140. The camera viewing angle adjustor 400 has a function of adjusting a viewing angle of the camera 140, and a function of ensuring that the entire robot 1 can move relative to the ground by preventing the body 100 from being rotated by a driving force of the tires 270 when the robot 1 moves forward or backward by the drivers 200 having the tires 270.

Battery units 300, in each of which a battery 320 is mounted, are provided in the axial centers of the drivers 200 on outer sides of the respective tires 270. Each battery unit 300 is protected by a battery housing cover 330.

The body 100 is covered with a shield cover 150 enclosing a frame 110. The shield cover 150 is fixed by two rubber rings 160. These rubber rings 160 will be described below in connection with configuration and effects thereof.

Next, an internal structure of the throw-type compact reconnaissance robot 1 will be described in detail with reference to FIGS. 3 and 4.

The throw-type compact reconnaissance robot is characterized in that the body 100 is made in a relatively small size and has the camera 140, that the drivers 200 are made up of the two tires 270 that are disposed on the opposite sides of the body 100 and can be driven individually, and that the battery units 300 are disposed in inner spaces of the respective drivers 200 on the outermost sides of the robot to supply power used for the operation of the robot.

In the throw-type compact reconnaissance robot 1, the body 100 functions as a main structure holding most electric parts and has rigidity. The body 100 includes the hollow frame 110 that is made of aluminum and forms a basic frame, the camera 140, and a C-shaped thin shield cover 150 that encloses the camera 140 and a circuit board 130. Further, the circuit board 130 is placed in a mounting space 120 that is an empty inner cavity of the frame 110 and is enclosed by the shield cover 150, and drives and controls the camera 140 and a wheel driving motor 210 of each driver 200.

The frame 110 is formed of aluminum, and includes a bottom plate 112 and disc-like side plates 113 that are vertically installed on opposite sides of the bottom plate 112 and support a support shaft 190. The bottom plate 112 and the two side plates 113 vertically installed on the opposite sides of the bottom plate define the mounting space 120 in which the circuit board 130 is placed.

A tail seat 111 to which the camera viewing angle regulator 400 is attached is additionally provided in the rear of the frame 110.

The camera 140 picking up the internal space of a building and the circuit board 130 controlling the camera are mounted in the mounting space 120. The embodiment describes only the camera 140 or the circuit board 130. If necessary, a repeater for radio telecommunication (not shown) and a control circuit (not shown) controlling the repeater may be mounted along with or apart from the camera 140, and they can increase a remote control distance by relaying a user control signal of another robot 1 that is thrown at the same time. For example, two throw-type compact reconnaissance robots 1 are simultaneously thrown, wherein the radio repeater mounted on one of them so as to be able to move and control the other to a distance. Thereby, it is possible to produce an effect of increasing a reconnaissance distance twice or more.

In addition to the camera 140 mounted in the frame 110, various sensors such as a flame sensor or a gas sensor may be additionally mounted to increase an applicable range. Further, a flash apparatus, an infrared generator, etc. may be mounted to enhance a quality of pickup image.

The support shaft 190 on which the drivers 200 and the battery units 300 are supported is disposed on the side plates 113 on the opposite sides of the frame 110. The support shaft 190 is provided with an axial hole 191 in an axial direction thereof so that a power line of each battery 320 is connected to the circuit board 130. The support shaft 190 is provided with a step around which a bearing 250 of each driving wheel 240 (see FIG. 3), and a groove in which a wheel spacer 260 of each driver 200 is inserted on an outer side of the step. Further, each battery unit 300 is supported on the support shaft 190 in such a manner that a case hole 311 of a battery housing 310 of each battery unit 300 is fitted around the support shaft 190. To this end, the support shaft 190 is provided with threads on an outer side thereof so that a wheel fixing nut 280 can be fastened (see FIG. 3). The battery housing 310 of each battery unit 300 is inserted around the support shaft 190, and is supported on the wheel spacer 260 on one side thereof and by a fastening nut on the other side.

The shield cover 150 protects the circuit board 130, the camera 140, and the electromagnetic devices such as the wheel driving motor 210, all of which are mounted in the frame 110, and is formed of ultrahigh molecular weight polyethylene in the form of a C-shaped thin plate. The shield cover 150 may be formed of a lightweight, durable plastic material that is easily available from the market. The throw-type compact reconnaissance robot of the present invention has a high possibility of getting a drop shock when thrown, and thus needs to be prepared for this possibility through use of the ultrahigh molecular weight polyethylene material.

The shield cover 150 includes a camera hole 152 through which a lens part of the camera 140 protrudes. The shield cover 150 may further include a camera protecting cover 153 to cover the camera hole 152 as needed. The camera protecting cover 153 is fastened by typical fastening members so as to be able to cover the camera hole 152 excluding the protrusion of the camera 153.

After all the electric parts to be mounted in the mounting space 120 of the frame 110 are mounted, the mounting space 120 is covered with the shield cover 150. The shield cover 150 has the form of a C-shaped thin plate, is covered to enclose the bottom plate 112 of the frame 110 with opposite outer circumferences thereof fitted to outer circumferences of the side plates 113. Further, the shield cover 150 is supported on the opposite sides thereof by two rubber rings 160, and is preferably provided with ring grooves 170 in which the rubber rings 160 can be placed.

Each rubber ring 160, by which the shield cover 150 is surrounded and fixed to the frame 110, plays an important role in reducing the drop shock when the throw-type compact reconnaissance robot of the present invention is thrown or launched to a scouting place. Further, the shield cover 150 is fixed by the flexible rubber rings 160 rather than by rigid fastening members such as bolts, so that the flexible rubber rings 160 do not only prevent the drop shock from being transferred to the internal electric parts but also reduce a weight or volume of the throw-type compact reconnaissance robot.

If necessary, each rubber ring 160 may also be provided with a space in which an antenna can be installed. In detail, when each rubber ring 160 surrounds and fastens the shield cover 150 with a metal wire capable of serving as an antenna embedded therein so that the metal wire is automatically connected to an antenna connector of the circuit board 130, the telecommunication is possible.

Two driving motor mounts 180, in which the two left-hand and right-hand wheel driving motors 210 are mounted, are provided at a lower portion of the bottom plate 112 of the frame 110. The driving motor mounts 180 may further include fixing members 211 for the wheel driving motors 210 as needed (see FIG. 4).

Each driver 200 includes the wheel driving motor 210, the driving wheel 240 that is fixed to the support shaft 190 of the frame 110, generates power, substantially takes charge of forward and backward movement, and in which the battery unit to be described below is mounted, and the tire 270.

The wheel driving motors 210 are provided with motor spur gears 220 on a power shaft thereof that are fitted into the driving motor mounts 180 of the frame 110 on the opposite sides of the frame, respectively. The motor spur gears 220 are connected to wheel spur gears 230 respectively, which are mounted on wheel bases 242 of the driving wheels 240 by fastening members, thereby transmitting the power.

Each driving wheel 240 includes the disc-like wheel base 242 having a wheel hole 241 and a cylindrical extension rib 243 around which the tire 170 is fitted. The wheel hole 241 is formed so as to have such a size that a bearing 250, which is fitted between the support shaft 190 and the driving wheel 240 and provides rolling friction, is fitted. The wheel base 242 is provided with fastening holes, through which the wheel spur gear 230 is fastened, around an outer circumference of the wheel hole 241 (see FIG. 5).

The cylindrical extension rib 243 is formed along an outer circumference of the disc-like wheel base 242. The extension rib 243 forms the space, in which the battery unit 300 is mounted, along with the wheel base 242. The extension rib 243 is provided with a tire seat 244, around which the tire 270 can be fitted on a radially outer side thereof.

It is more advantageous that each tire 270 is formed so as to have a spatial area in which air can be filled as shown in FIGS. 3 and 4 in terms of reducing the drop shock when the robot 1 is thrown to hit the ground. The spatial area of the tire 270 may be filled with a sponge instead of the air in order to reduce the drop shock.

The tire 270 preferably has a diameter larger than that of the frame 100 of the body 100 or the shield cover 150 in terms of reducing the drop shock or ensuring the mobility.

The tire 270 is preferably formed of a rubber material in terms of reducing rolling noise when driven. Further, it is advantageous that the tire 270 is provided with small protrusions or various embossments on an outer surface thereof in terms of ensuring smoother movement on the ground in a slippery monitoring space. When the tire 270 is formed of the rubber material in this way, it is advantageous because slip can be prevented when the robot is thrown by hand instead of a launch machine (not shown).

The two spur gears 220 and 230 are used to connect the wheel driving motor 210 and the driving wheel 240 of the throw-type compact reconnaissance robot 1. When the wheel driving motor 210 and the driving wheel 240 are separated from each other in this way, it is preferable because the drop shock when the robot is thrown to hit the ground is prevented from directly influencing the motor. In this case, a gear ratio between the motor spur gear 220 and the wheel spur gear 230 may be adjusted, so that torque and speed of the robot can be arbitrarily adjusted.

Further, the present invention employs only the two wheel driving motors 210, and thus has an advantage in which the free movement, the low consumption of power, and the long-term operation are possible compared to the related art using four wheel driving motors. Further, the wheel driving motors are configured to be easily mounted and demounted without a complicated mechanism, so that a function of reducing the internal weight of the driving wheel 240 and a function of relieving a shock are realized.

Next, the battery unit 300 of the present invention will be described in detail with reference to FIGS. 3 to 5.

The battery unit 300 of the throw-type compact reconnaissance robot 1 of the present invention includes a battery housing 310 that has a substantially cylindrical shape and is open to one side thereof. The battery housing 310 is provided with case hole 311 in the bottom thereof into which the support shaft 190 of the body 100 is fitted, and a battery 320 is placed in a battery mounting space 312 that is an internal space. The entire battery housing 310 including the battery 320 is held in the inner space of the cylindrical driving wheel 240.

The open side of the battery housing 310 is closed by a battery housing cover 330 after the battery 320 is mounted. The closure of the battery housing cover 330 is preferably makes good use of fastening members such as bolts in order to secure convenience of exchanging the battery 320.

The throw-type compact reconnaissance robot 1 of the present invention has an advantage in that it can be operated for a long time because the battery space is sufficiently secured using the internal space of the driving wheel 240 of the tire 270. Further, the batteries 320, each of which has relatively heavy weight, are disposed on the opposite outermost sides of the robot 1 having the shape of an approximately straight line, thereby providing dynamic stability when the robot 1 falls down or moves forwards in a rough monitoring space.

Further, the battery 320 is mounted on the outermost side of the robot so as to provide easy access using the battery housing cover 330, so that it is easily mounted and demounted, which leads to various applications.

Further, the battery housing cover 330, one surface of which has an approximately spherical shape, has a function of absorbing the drop shock when the robot 1 hits the ground, and an effect of preventing the robot from standing to one side.

Among the components of the present invention, the driving wheel 240, the battery housing 310, and the battery housing cover 330 are preferably formed of ultrahigh molecular weight polyethylene in order to sufficiently absorb the drop shock, and the motor spur gear 220 and the wheel spur gear 230 are preferably formed of acetal as a typical material.

Next, the camera viewing angle adjustor 400 of the throw-type compact reconnaissance robot 1 of the present invention will be described in detail with reference to FIGS. 3 and 6.

The camera viewing angle adjustor 400 of the present invention includes a tail 420 that is mounted on a tail seat 111 of the frame 110 of the body 100 and substantially adjusts a viewing angle of the camera by rotation, and a tail driving motor 410 that rotates the tail 420 relative to the body 100. The tail 420 is formed of aluminum, and has a joint hole 421 into which the tail driving motor 410 is fitted and a tail extension part 422. The tail extension part 422 may be formed in various shapes as needed, in addition to the shape shown in FIG. 6.

The tail driving motor 410 is selected from step motors so as to be able to precisely adjust an angle.

The tail 420 is folded in contact with the body 100 when the robot is thrown, and thus is protected by the rubber tires 270 and is unfolded at a proper angle when the robot falls down and is driven normally.

The tail 420 makes stable movement possible when the two driving wheels 240 are driven. For example, in the case where the tail 420 is not provided, the robot 1 fails to move forward by relative rotation between the body 100 and the driving wheels 240 in spite of rotation of the wheel driving motors 210. The tail 420 functions to adjust the viewing angle of the camera using the tail driving motor 410 as well as to increase a height to which the robot passes through an obstacle. FIG. 7 shows an example where, as a rotational angle of the tail 420 is changed from A to A', the viewing angle of the camera is changed (see an arrow directed in a forward direction). When the throw-type compact reconnaissance robot has been made compact in order to be easily thrown, the robot has encountered a problem in that the viewing angle become narrow. As such, it is essential to adjust the viewing angle of the camera as in the present invention. In the present invention, the viewing angle of the camera is adjusted using the tail 420 that is essential for the forward movement of the cylindrical robot, so that the effects of reducing cost and weight can be achieved at the same time.

Next, a throw-type compact reconnaissance robot according to a second embodiment of the present invention will be described in detail with reference to FIG. 8.

The throw-type compact reconnaissance robot of the present invention may be designed as a reconnaissance robot having four wheels by connecting two modular stand-alone robots 1.

This connection makes use of a connector member 500 provided specially. To this end, the frame 110 of the body 100 is provided with a fastening area on one side thereof to which the connector member 500 is fastened. Thus, the connection is made by fastening members such as typical bolts. An additional electric part for mounting a high-performance camera may be mounted in an internal connecting space 510 of the connector member 500 which is secured by this connection. Further, this connection makes it possible to drive the robot at a little bit large obstacle terrain and at a rough terrain and to increase the operational time when the battery 320 is additionally installed in the connecting space 510.

When the two robots are interconnected in this way, unnecessary parts such as the wheel driving motors 210 may be removed from one of the robots, for instance the robot 1 located behind in FIG. 8 for the purpose of cost reduction.

Next, the operation of the throw-type compact reconnaissance robot 1 of the present invention will be described.

First, in the state where the tail 420 of the camera viewing angle adjustor 400 mounted on the reconnaissance robot 1 of the present invention is folded toward the body 100, the reconnaissance robot 1 is surrounded or not by a separate protector (not shown), and then is launched to an area to be reconnoitered by a separate launch machine (not shown) or is thrown to an area to be reconnoitered by hand.

The thrown reconnaissance robot 1 gets a drop shock when it hits the ground. The throw-type compact reconnaissance robot 1 of the present invention is configured so that the tires 270 absorb the shock to a high level. Thus, the shock transferred to the circuit board 130 and the camera 140 housed in the body 100 is reduced. Further, the drop shock is reduced by the rubber rings 160 surrounding the shield cover 150. In addition, since the driving wheels 240 as well as the battery housing 310 and battery housing cover 330 surrounding the battery 320 are formed of ultrahigh molecular weight polyethylene strong to the shock, the throw-type compact reconnaissance robot 1 is much strong to the shock.

The robot 1 reaching a reconnoitering space unfolds the tail 420 to a proper angle using the tail driving motor 410, thereby completing the preparation for movement. The tail 420 is unfolded to prevent the rotation of the body 100 so as to maintain a predetermined angle with respect to the ground. Thereby, the movement caused by the rotation of the driving wheels 240 is possible. The turnabout and the forward and backward movements are freely possible by the operation of the two stand-alone wheel driving motors 210.

If necessary, the tail driving motor 410 is driven to adjust the angle of the tail 420 with respect to the body 100, so that it is possible to adjust the viewing angle of the camera 140.

The throw-type compact reconnaissance robot 1 of the present invention secures sufficient space for the battery 320 in the driving wheel 240, so that it can be made compact and significantly increase its operational time.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A throwing compact reconnaissance robot comprising:
    a cylindrical body with a camera;
    drivers made up of two tires that are disposed on opposite sides of the body and can be driven individually; and
    battery units supplying power used to operate the robot and disposed in inner spaces of the tires of the drivers on opposite outermost sides of the robot,
    wherein the body includes a frame in which electric parts are mounted and a shield cover that surrounds the frame and has a shape of a C-shaped thin plate, the frame and the shield cover of the body have rubber rings fitted around them, and each rubber ring includes a metal wire serving as an antenna embedded therein so that the metal wire is connected to a circuit board for telecommunication mounted in the body and functions as the antenna when remote control is performed by radio.

2. The throwing compact reconnaissance robot as set forth in claim 1, wherein: each driver includes a cylindrical driving wheel; each tire is fitted on an outer side of the driving wheel in a radial direction; and each battery unit is disposed in an inner space of the cylindrical driving wheel.

3. The throwing compact reconnaissance robot as set forth in claim 1, wherein: each driver includes a cylindrical driving wheel and a wheel driving motor; and the driving wheel and the wheel driving motor are geared to transmit a driving force.

4. The throwing compact reconnaissance robot as set forth in claim 1, wherein each tire is filled therein with air or a sponge so as to be able to absorb a shock when dropped.

5. The throwing compact reconnaissance robot as set forth in claim 1, wherein each battery unit includes a cylindrical battery housing, a battery mounted in the battery housing, and a battery housing cover.

6. The throwing compact reconnaissance robot as set forth in claim 5, wherein the battery housing and battery housing cover are each formed of supramolecular polyethylene.

7. The throwing compact reconnaissance robot as set forth in claim 1, wherein the body includes a tail mounted on a rear surface thereof.

8. The throwing compact reconnaissance robot as set forth in claim 7, wherein the tail is adjusted in angle by a tail driving motor so as to be able to adjust a viewing angle of the camera.

9. The throwing compact reconnaissance robot as set forth in claim 1, wherein the robot is connected to another throwing compact reconnaissance robot using a connector member, in an internal connecting space of which a battery, an electric part, etc. are mounted as needed.

10. The throwing compact reconnaissance robot as set forth in claim 1, wherein the body further includes a repeater for telecommunication.

* * * * *

UNITED STATES PATENT AND TRADEMARK OFFICE
CERTIFICATE OF CORRECTION

PATENT NO. : 8,505,667 B2
APPLICATION NO. : 13/166057
DATED : August 13, 2013
INVENTOR(S) : Soohyun Kim et al.

Page 1 of 1

It is certified that error appears in the above-identified patent and that said Letters Patent is hereby corrected as shown below:

Title Page, Item (73) Assignee

Please replace with the following:

KOREA ADVANCED INSTITUTE OF SCIENCE AND TECHNOLOGY (KR); DUKSAN MECASYS INC. (KR)

Signed and Sealed this
Twenty-fifth Day of February, 2014

Michelle K. Lee
*Deputy Director of the United States Patent and Trademark Office*